United States Patent
Frish

(10) Patent No.: US 10,184,663 B2
(45) Date of Patent: Jan. 22, 2019

(54) AIR COOLED FUEL INJECTOR FOR A TURBINE ENGINE

(71) Applicant: United Technologies Corporation, Hartford, CT (US)

(72) Inventor: John D. Frish, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 314 days.

(21) Appl. No.: 15/023,606

(22) PCT Filed: Oct. 6, 2014

(86) PCT No.: PCT/US2014/059314
§ 371 (c)(1),
(2) Date: Mar. 21, 2016

(87) PCT Pub. No.: WO2015/054136
PCT Pub. Date: Apr. 16, 2015

(65) Prior Publication Data
US 2016/0230998 A1    Aug. 11, 2016

Related U.S. Application Data

(60) Provisional application No. 61/887,716, filed on Oct. 7, 2013.

(51) Int. Cl.
*F02C 7/18* (2006.01)
*F23R 3/28* (2006.01)
*F23R 3/14* (2006.01)
*F02C 7/22* (2006.01)

(52) U.S. Cl.
CPC ............... *F23R 3/283* (2013.01); *F02C 7/18* (2013.01); *F02C 7/222* (2013.01); *F23R 3/14* (2013.01); *F23R 3/286* (2013.01); *F05D 2220/32* (2013.01); *F05D 2260/20* (2013.01)

(58) Field of Classification Search
CPC .. F23R 3/283; F23R 3/286; F23R 3/14; F02C 7/18; F02C 7/222; F02C 7/22; F05D 2260/20; F05D 2260/232
See application file for complete search history.

(56) References Cited

U.S. PATENT DOCUMENTS

| 4,409,791 A * | 10/1983 | Jourdain ................. F02C 7/222 60/240 |
| 5,423,178 A | 6/1995 | Mains |
| 5,735,115 A | 4/1998 | Maghon |
| 6,240,731 B1 | 6/2001 | Hoke et al. |
| 6,311,471 B1 | 11/2001 | Waldherr et al. |

(Continued)

FOREIGN PATENT DOCUMENTS

GB    588847    6/1947

OTHER PUBLICATIONS

EP search report for EP14852242.8 dated Oct. 7, 2016.

*Primary Examiner* — Steven Sutherland
(74) *Attorney, Agent, or Firm* — O'Shea Getz P.C.

(57) ABSTRACT

An assembly is provided for a turbine engine. The assembly includes a cooling tube through which a flow path extends. The assembly also includes a fuel injector, which includes a stem connected to a tip. The stem is arranged within the cooling tube. The tip extends from the cooling tube to a nozzle. The cooling tube is adapted to direct cooling air through the flow path.

20 Claims, 6 Drawing Sheets

(56) References Cited

U.S. PATENT DOCUMENTS

| | | |
|---|---|---|
| 6,357,237 B1 | 3/2002 | Candy et al. |
| 7,337,614 B2 | 3/2008 | Cowan |
| 8,020,366 B2 | 9/2011 | Cowan |
| 8,186,164 B2 | 5/2012 | Cowan |
| 8,291,706 B2 | 10/2012 | Tanner et al. |
| 8,347,630 B2 | 1/2013 | Lovett et al. |
| 2002/0073707 A1 | 6/2002 | Lavie et al. |
| 2002/0134084 A1* | 9/2002 | Mansour ............... F23D 11/107 60/740 |
| 2009/0151360 A1 | 6/2009 | Burd et al. |
| 2010/0071667 A1 | 3/2010 | Hicks et al. |

\* cited by examiner

AIR COOLED FUEL INJECTOR FOR A TURBINE ENGINE

CROSS-REFERENCE TO RELATED APPLICATIONS

This application claims priority to PCT Patent Application No. PCT/US14/59314 filed Oct. 6, 2014, which claims priority to U.S. Provisional Application Ser. No. 61/887,716 filed Oct. 7, 2013, which are hereby incorporated herein by reference in their entireties.

BACKGROUND OF THE INVENTION

1. Technical Field

This disclosure relates generally to a turbine engine and, more particularly, to a combustor section of a turbine engine.

2. Background Information

A typical fuel delivery system for a turbine engine provides fuel to a plurality of fuel injectors. These fuel injectors are arranged in a plenum adjacent a combustor of the turbine engine. The fuel injectors inject the fuel into a combustion chamber of the combustor. The injected fuel is subsequently ignited to power the turbine engine.

When the fuel reaches a temperature above a certain temperature, the fuel can coke within the fuel injectors and reduce fuel flow through the injectors and into the combustion chamber. Each fuel injector therefore typically includes a heat shield that shields internal fuel conduits from relatively hot core air within the plenum. Such a heat shield, however, may have a limited heat shielding effect.

There is a need in the art for an improved fuel injector assembly that can shield fuel from relatively high engine temperatures.

SUMMARY OF THE DISCLOSURE

According to an aspect of the invention, an assembly is provided for a turbine engine. The assembly includes a cooling tube through which a flow path extends. The assembly also includes a fuel injector, which includes a stem connected to a tip. The stem is arranged within the cooling tube. The tip extends from the cooling tube to a nozzle. The cooling tube is adapted to direct cooling air through the flow path.

According to another aspect of the invention, another assembly is provided for a turbine engine. The assembly includes a combustor, a cooling tube and a fuel injector. The combustor includes a combustion chamber. The cooling tube is adjacent the combustor. The fuel injector includes a nozzle adapted to inject fuel into the combustion chamber. At least a portion of the fuel injector is arranged within a flow path that extends through the cooling tube. The cooling tube is adapted to direct cooling air through the flow path.

The fuel injector may include a stem connected to a tip. The stem may be arranged within the cooling tube. The tip may be interfaced with the combustor.

A portion of the flow path may have an annular cross-sectional geometry defined between the cooling tube and the stem.

At least a portion of the flow path may have a parti-annular cross-sectional geometry defined between the cooling tube and the fuel injector.

The cooling tube may include an outlet. A portion of the flow path may extend from the fuel injector to the outlet.

The stem may extend along an axis. The tip may extend radially out from the stem relative to the axis.

The fuel injector may include a fuel conduit that extends through the stem and is fluidly coupled with the nozzle. This fuel conduit may be one of a plurality of fuel conduits that extend through the stem and are fluidly coupled with the nozzle.

An air gap may extend around the fuel conduit and between the fuel conduit and the stem.

The assembly may include a base connected to the cooling tube and the stem. The base may be adapted to mount the cooling tube and the fuel injector to a case of the turbine engine. A portion of the flow path may extend through the base.

The assembly may include a heat exchanger. This heat exchanger may be adapted to provide the cooling air to the cooling tube.

The assembly may include a duct adapted to receive the cooling air from the cooling tube. The cooling tube may be connected to the duct by a moveable joint.

The assembly may include a turbine component. The duct may be adapted to provide the cooling air to the turbine component, for example, to cool the turbine component. The turbine component may be, for example, a rotor blade, a stator blade or a rotor disk.

The assembly may include a swirler mated with the tip.

The foregoing features and the operation of the invention will become more apparent in light of the following description and the accompanying drawings.

DETAILED DESCRIPTION OF THE INVENTION

Figure 1:
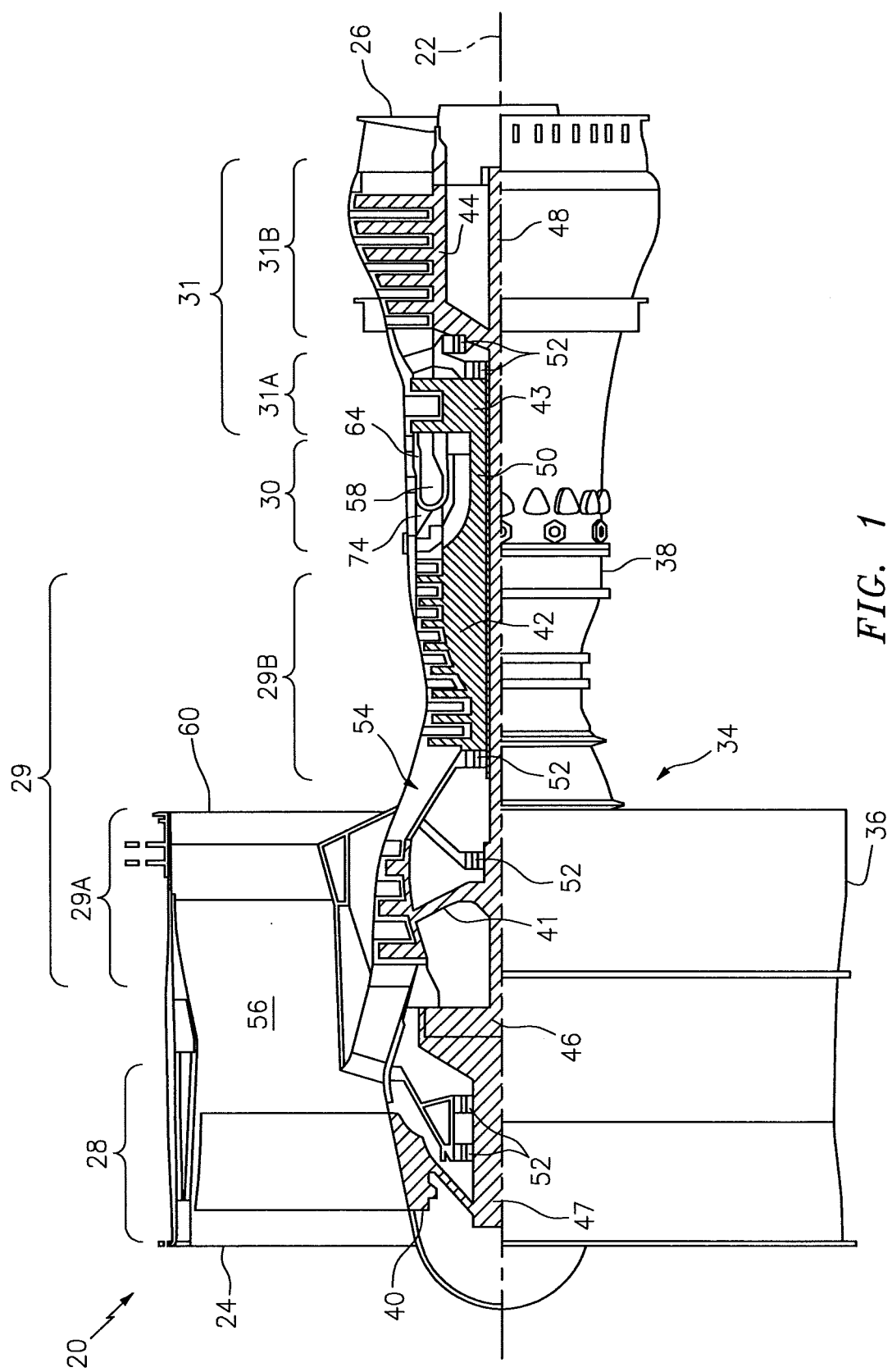
FIG. 1 is a side cutaway illustration of a geared turbine engine.

FIG. 1 is a side cutaway illustration of a geared turbine engine 20. This engine 20 extends along an axial centerline 22 between an upstream airflow inlet 24 and a downstream airflow exhaust 26. The engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 34, which includes a first engine case 36 (e.g., a fan nacelle) and a second engine case 38 (e.g., a core nacelle).

Each of the engine sections 28, 29A, 29B, 31A and 31B includes a respective rotor 40-44. Each of the rotors 40-44 includes a plurality of rotor blades arranged circumferentially around and connected to (e.g., formed integral with or mechanically fastened, welded, brazed, adhered or otherwise attached to) one or more respective rotor disks. The fan rotor 40 is connected to a gear train 46 (e.g., an epicyclic gear train) through a shaft 47. The gear train 46 and the LPC rotor 41 are connected to and driven by the LPT rotor 44 through a low speed shaft 48. The HPC rotor 42 is connected to and driven by the HPT rotor 43 through a high speed shaft 50. The shafts 47, 48 and 50 are rotatably supported by a plurality of bearings 52. Each of the bearings 52 is connected to the second engine case 38 by at least one stator such as, for example, an annular support strut.

Air enters the engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air".

The core air is directed through the engine sections 29-31 and exits the engine 20 through the airflow exhaust 26. Within the combustor section 30, fuel is injected into an annular combustion chamber 58 and mixed with the core air. This fuel-core air mixture is ignited to power the engine 20 and provide forward engine thrust. The bypass air is directed through the bypass gas path 56 and out of the engine 20 through a bypass nozzle 60 to provide additional forward engine thrust. Alternatively, the bypass air may be directed out of the engine 20 through a thrust reverser to provide reverse engine thrust.

Figure 2:
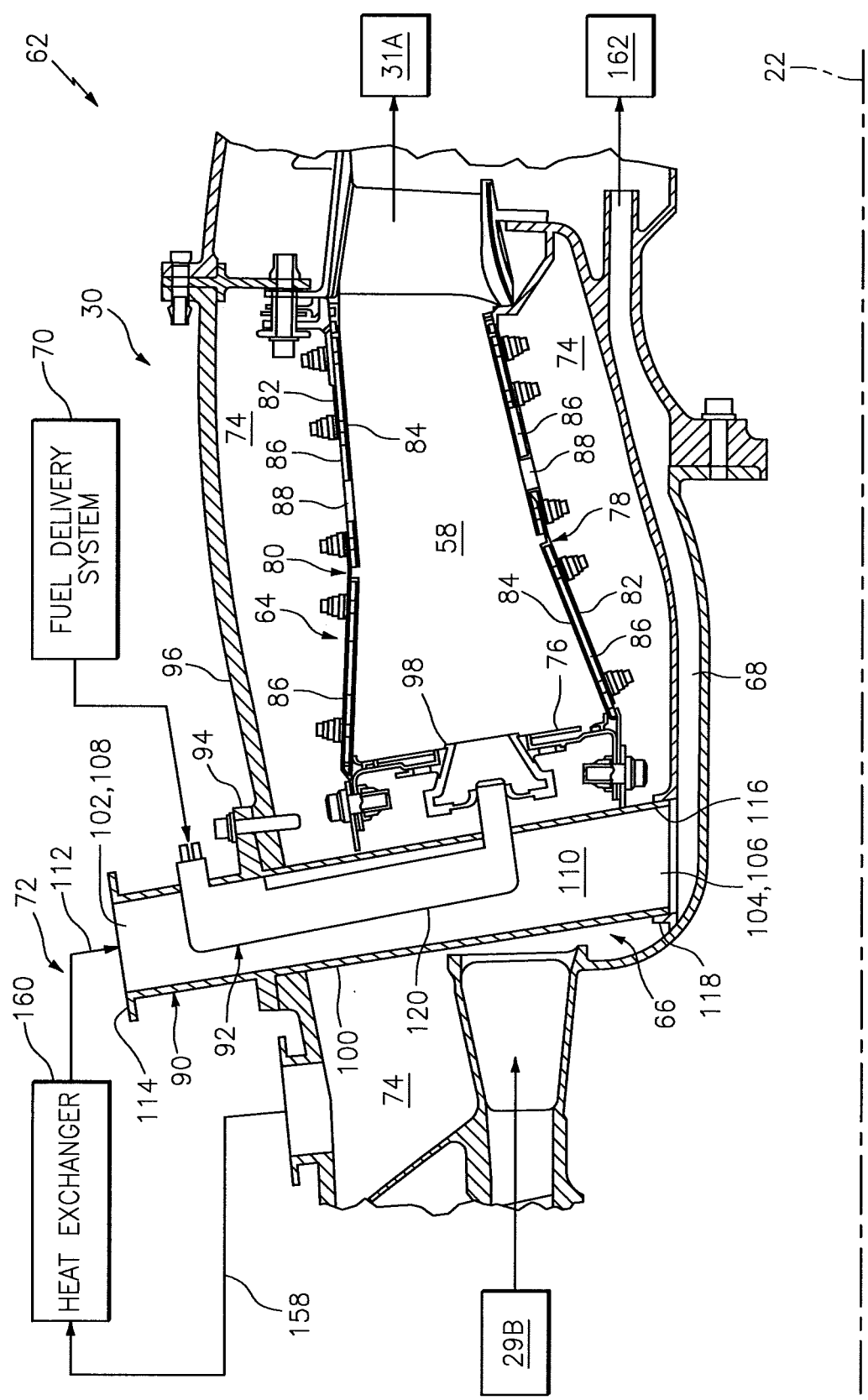
FIG. 2 is an illustration of an assembly of the turbine engine.

FIG. 2 illustrates an assembly 62 of the engine 20. This assembly 62 includes a combustor 64, one or more cooled fuel injector assemblies 66, and a duct 68. The assembly 62 also includes a fuel delivery system 70 and a heat exchanger system 72.

Figure 3:
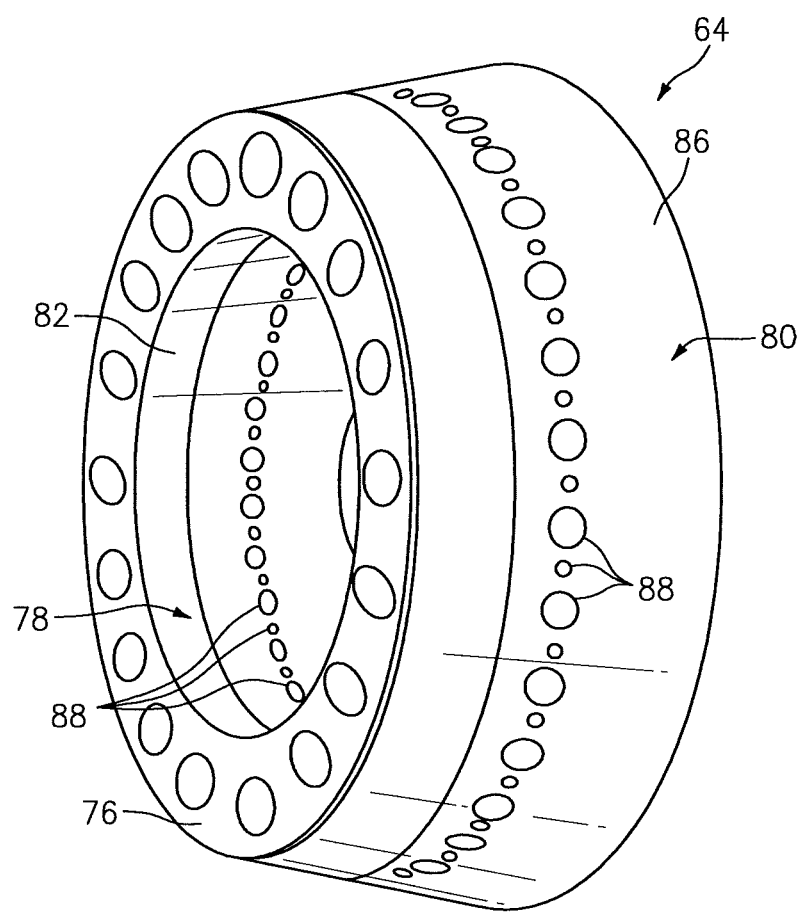
FIG. 3 is a perspective illustration of a portion of a combustor.

The combustor 64 is arranged with in an annular plenum 74 of the combustor section 30. Referring to FIGS. 2 and 3, the combustor 64 includes an annular combustor bulkhead 76, a tubular combustor inner wall 78, and a tubular combustor outer wall 80. The bulkhead 76 extends radially between and is connected to the inner wall 78 and the outer wall 80. The inner wall 78 and the outer wall 80 each extends axially along the centerline 22 from the bulkhead 76 towards the turbine section 31A, thereby defining the combustion chamber 58.

Referring to FIG. 2, the inner wall 78 and the outer wall 80 may each have a multi-walled structure; e.g., a hollow dual-walled structure. The inner wall 78 and the outer wall 80 of FIG. 2, for example, each includes a tubular combustor shell 82, a tubular combustor heat shield 84, and one or more cooling cavities 86 (e.g., impingement cavities). These cooling cavities 86 fluidly couple cooling apertures (e.g., impingement apertures) in the shell 82 with cooling apertures (e.g., effusion apertures) in the heat shield 84. The inner wall 78 and the outer wall 80 also each include a plurality of quench apertures 88, which are arranged circumferentially around the centerline 22.

The fuel injector assemblies 66 are disposed around the centerline 22, and mated with the bulkhead 76. Each of the fuel injector assemblies 66 includes a cooling tube 90, a fuel injector 92, and a base 94 (e.g., an annular flange). The base 94 is connected to the cooling tube 90 and the fuel injector 92, and mounts the cooling tube 90 and the fuel injector 92 to a case 96 of the turbine engine 20. One or more of the fuel injector assemblies 66 may also each interface with a swirler 98 mated with the bulkhead 76.

Figure 4:
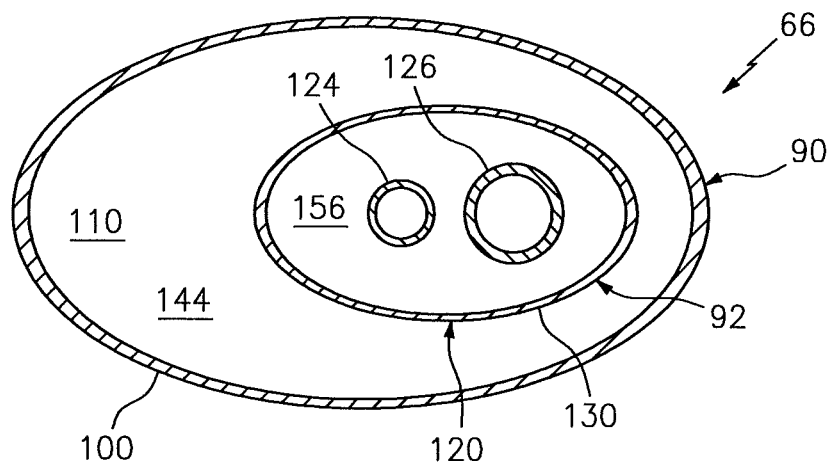
FIG. 4 is a cross-sectional illustration of a portion of a fuel injector assembly.

The cooling tube 90 includes a sidewall 100, a cooling air inlet 102, and a cooling air outlet 104. The sidewall 100 and, thus, the cooling tube 90 extend generally radially relative to the centerline 22 between an inner end 106 and an outer end 108. The sidewall 100 partially defines a cooling air flow path 110 that extends through the cooling tube 90 between and fluidly couples the inlet 102 and the outlet 104. The sidewall 100 may have an elliptical cross-sectional geometry as illustrated in FIG. 4. Alternatively, the sidewall 100 may have a circular cross-sectional geometry, a tear drop cross-sectional geometry, a rectangular cross-sectional geometry, or any other cross-sectional geometry. The sidewall 100 may also include heatshielding such as, for example, one or more coatings and/or the sidewall 100 may be configured as a multiple wall structure (e.g., a hollow double-layered wall).

Referring again to FIG. 2, the inlet 102 is located at the outer end 108. The inlet 102 is fluidly coupled with a duct 112 of the heat exchange system 72. The cooling tube 90, for example, may include an annular mounting flange 114 at the outer end 108 that is mounted (e.g., mechanically fastened) to the duct 112.

The outlet 104 is located at the inner end 106. The outlet 104 is fluidly coupled with the duct 68. A portion 116 of the cooling tube 90 at the inner end 106, for example, may extend into an annular mounting flange 118 of the duct 68, thereby forming a movable joint. The cooling tube portion 116 may slide radially within the mounting flange 118 during engine operation. In this manner, the movable joint may accommodate thermally induced movement between the cooling tube 90 and the duct 68 and, more particularly, between the case 96 and the duct 68.

Figure 5:
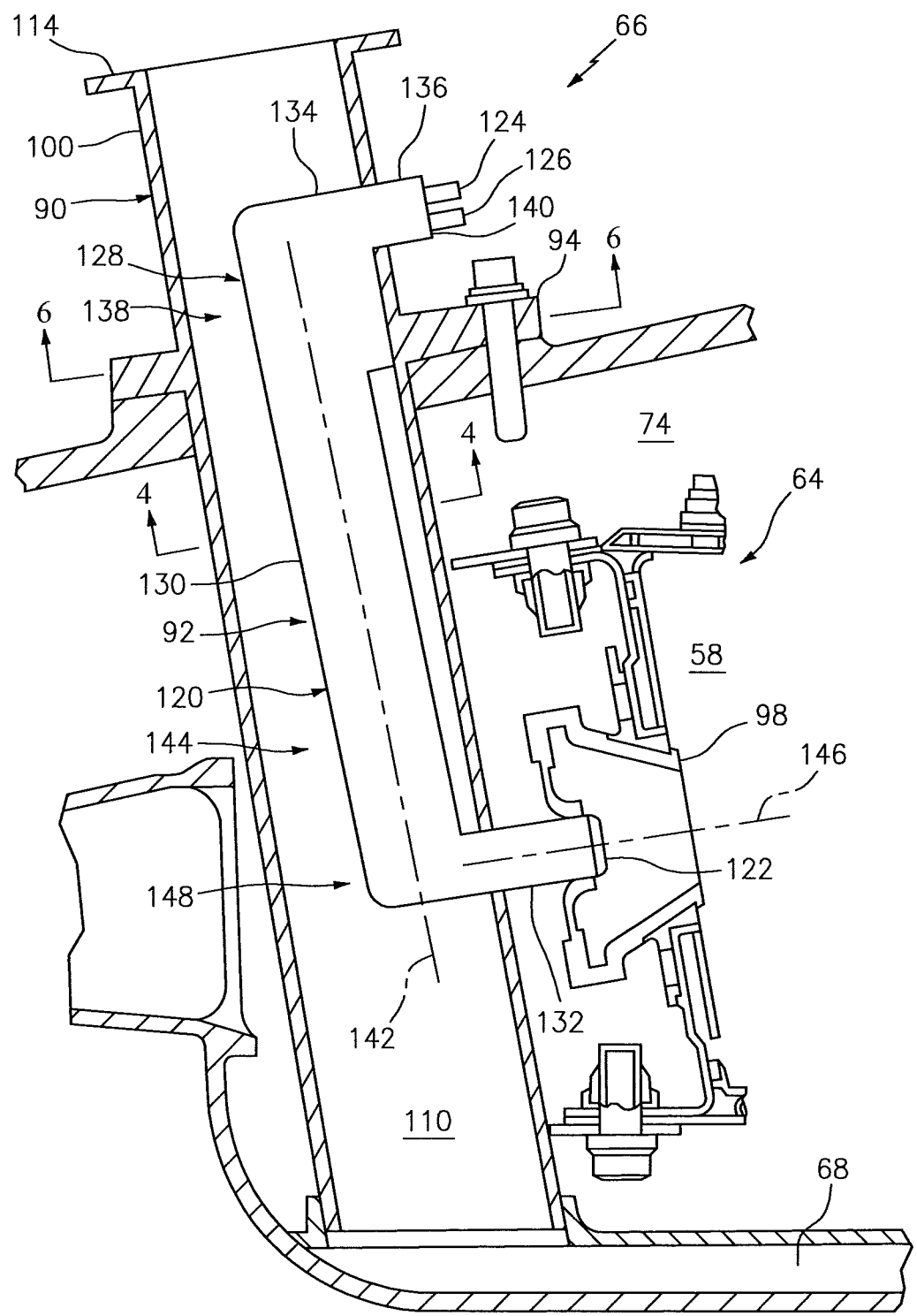
FIG. 5 is a side cutaway illustration of the fuel injector assembly within a combustor section of the turbine engine.

Referring to FIG. 5, the fuel injector 92 includes an injector housing 120, a nozzle 122, and one or more fuel conduits 124 and 126. The injector housing 120 includes a base 128, a stem 130 and a tip 132.

Figure 6:
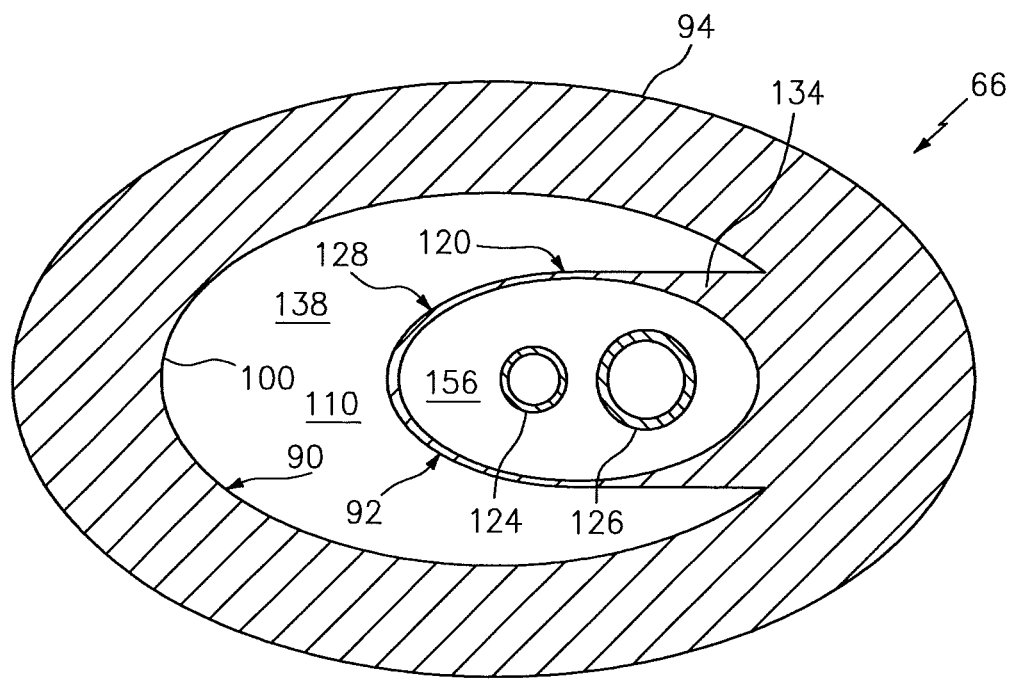
FIG. 6 is a cross-sectional illustration of another portion of the fuel injector assembly.

The base 128 includes an interior portion 134 and an exterior portion 136. The interior portion 134 is arranged within the cooling tube 90 between the stem 130 and the exterior portion 136. One or more metering valves for the fuel injector 92, if utilized, may be in either the interior portion 134 or exterior portion 136. Referring to FIGS. 5 and 6, the interior portion 134 is connected to the base 94 through the sidewall 100. The interior portion 134 forms a portion 138 of the flow path 110 with the cooling tube 90. The flow path portion 138 may have a parti-annular cross-sectional geometry as illustrated in FIG. 6. Referring to FIG. 5, the exterior portion 136 extends out from the cooling tube 90 to a distal end 140.

The stem 130 is arranged within the cooling tube 90. The stem 130 extends along an axis 142 (e.g., generally radially relative to the centerline 22) between and is connected to the base 128 and the tip 132. The stem 130 may have an elliptical cross-sectional geometry. Alternatively, the stem 130 may have a circular cross-sectional geometry, a tear drop cross-sectional geometry, a rectangular cross-sectional geometry, or any other cross-sectional geometry. Referring to FIGS. 4 and 5, the stem 130 forms a portion 144 of the flow path 110 with the cooling tube 90. The flow path portion 144 may have an annular cross-sectional geometry as illustrated in FIG. 4. In this manner, the flow path portion 144 substantially thermally decouples the stem 130 from the sidewall 100.

Referring to FIG. 5, the tip 132 extends along an axis 146 (e.g., generally radially relative to the axis 142) through the sidewall 100 to the nozzle 122. The tip 132 may or may not be integral with the cooling tube 100. The tip 132 may have a circular cross-sectional geometry. Alternatively, the stem 130 may have an elliptical cross-sectional geometry, a tear drop cross-sectional geometry, a rectangular cross-sectional geometry, or any other cross-sectional geometry adapted to mate with the swirler 98. The tip 132 may form a portion 148 of the flow path 110 with the cooling tube 90. The flow path portion 148 may have a parti-annular cross-sectional geometry similar to that illustrated in FIG. 6.

Figure 7:
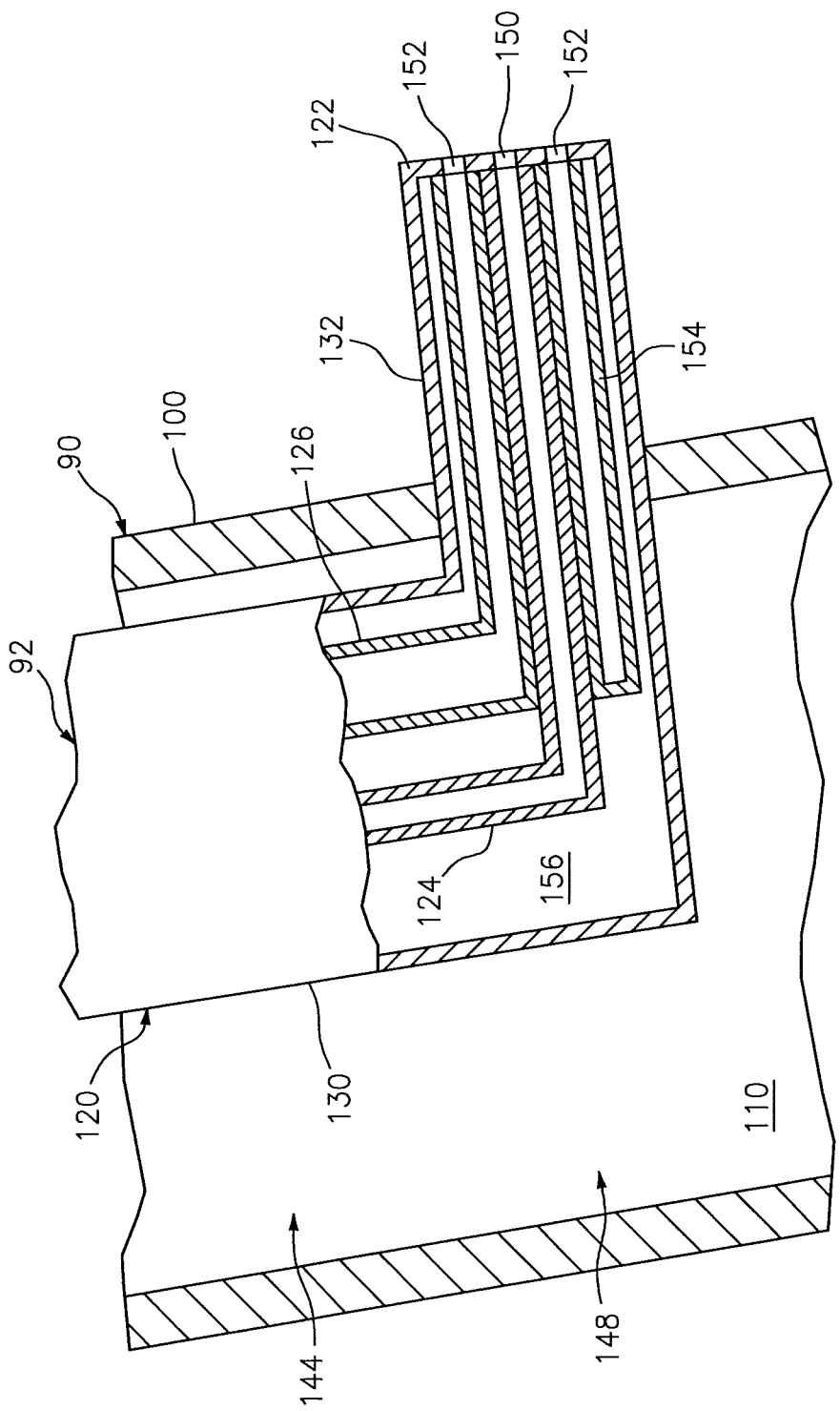
FIG. 7 is a side cutaway illustration of a portion of the fuel injector assembly.

Referring to FIG. 7, the nozzle 122 includes one or more nozzle apertures 150 and 152. The nozzle apertures 152 are arranged circumferentially around the axis 146 (see FIG. 5) and the nozzle aperture 150. The nozzle aperture 150 is fluidly coupled with the fuel conduit 124. The nozzle apertures 152 are fluidly coupled with the fuel conduit 126, for example, through an annular fuel manifold 154 within the tip 132. Each of the nozzle apertures 150 and 152 is adapted to receive fuel from the respective fuel conduit 124, 126, and inject the fuel into the combustion chamber 58.

Referring to FIG. 2, the fuel conduits 124 and 126 are fluidly coupled with and receive the fuel from the fuel delivery system 70. Referring to FIGS. 4-7, the fuel conduits 124 and 126 extend from the distal end 140, through the injector housing 120, to the nozzle 122. In particular, the fuel conduits 124 and 126 are arranged within and extend through an interior housing cavity 156 (e.g., a sealed cavity) formed by the base 128, the stem 130, the tip 132 and the nozzle 122. An air gap may extend circumferentially around each fuel conduit 124, 126. This air gap may also extend between the respective fuel conduit 124, 126 and the injector housing 120 and/or the other fuel conduit 126, 124. In this manner, the air gap may substantially thermally decouple each of the fuel conduits 124 and 126 from the injector housing 120.

During operation of the turbine engine assembly 62 of FIG. 2, the plenum 74 receives compressed core air from the compressor section 29B. The plenum 74 provides a portion of this core air to the combustor 64 for the combustion process. Each swirler 98, for example, directs some of the core air from the plenum 74 into the combustion chamber 58 in a manner that facilitates mixing the core air with the fuel injected by the respective fuel injector 92. The quench apertures 88 direct additional core air into the combustion chamber 58 to tailor the fuel-core air mixture within the combustion chamber 58. The fuel-core air mixture is ignited to power the turbine engine 20.

The plenum 74 also provides a portion of the core air to heat exchange system 72 through a duct 158. The heat exchange system 72 includes a heat exchanger 160 that cools the core air to provide cooling air. The heat exchanger 160 may be configured as an air-air heat exchanger, which transfers heat energy from the core air into bypass air from the bypass gas path 56. Alternatively, the heat exchanger 160 may be configured as a fuel-air heat exchanger, which transfers heat energy from the core air into the fuel provided by the fuel delivery system 70. Still alternatively, the heat exchanger 160 may be configured as a oil-air heat exchanger, which transfers heat energy from the core air into lubrication oil utilized for lubricating one or more turbine engine components; e.g., the bearings 52 (see FIG. 1). The heat exchange system 72, however, is not limited to the foregoing heat exchanger configurations.

The heat exchange system 72 provides the cooling air to the cooling tube 90. The cooling tube 90 directs the cooling air through the flow path 110 and into the duct 68. Within the flow path 110, the cooling air provides a thermal buffer between the relatively hot core air within the plenum 74 and the fuel injector 92. The fuel within the conduits 124 and 126 therefore may be maintained within a temperature range that may reduce or prevent fuel coking within the fuel injector 92. In addition to the foregoing, the cooling tube 90 also provides mechanical support for the injector housing 120.

The cooling tube 90, for example, structurally ties the injector housing 120 to the case 96 and the duct 68.

The duct 68 provides the cooling air received from the cooling tube 90 to one or more components 162 within the turbine section 31 (i.e., turbine components). Examples of one of the turbine components 162 include, but are not limited to, a turbine rotor blade, a turbine rotor disk and a turbine stator blade within the HPT section 31A. The heat exchange system 72 and/or the duct 68, of course, may also or alternatively provide the cooling air to one or more components in other sections of the engine 20.

In some embodiments, the heat exchange system 72 may receive air other than core air from the plenum 74. The heat exchange system 72, for example, may receive bypass air from the bypass gas path 56. In other embodiments, the assembly 62 may be configured without the heat exchange system 72. The cooling tube 90, for example, may receive bypass air from the bypass gas path 56.

In some embodiments, the stem 130 may be connected to the sidewall 100. In such an embodiment, the flow path portion 144 may have a parti-annular cross-sectional geometry similar to that of the flow path portion 138 illustrated in FIG. 6.

In some embodiments, the cooling tube 90 and the base 94 may be formed integral with the injector housing 120. The cooling tube 90, the base 94 and the injector housing 120, for example, may be cast and/or machined having a unitary body. Alternatively, the cooling tube 90, the base 94 and/or the injector housing 120 may be formed as discrete bodies that are mechanically fastened and/or bonded together.

The turbine engine assembly 62 may be included in various turbine engines other than the one described above. The assembly 62, for example, may be included in a geared turbine engine where a gear train connects one or more shafts to one or more rotors in a fan section, a compressor section and/or any other engine section. Alternatively, the assembly 62 may be included in a turbine engine configured without a gear train. The assembly 62 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, the assembly comprising:
   a cooling tube through which a flow path extends; and
   a fuel injector including a stem connected to a tip, the stem arranged within the cooling tube, and the tip extending through a sidewall of the cooling tube to a nozzle located outside of the cooling tube;
   wherein the cooling tube is adapted to direct cooling air through the flow path;

wherein the cooling tube extends radially relative to a centerline of the turbine engine between an inner end and an outer end; and wherein the cooling tube includes a cooling air inlet and a cooling air outlet, the cooling air inlet is located at the outer end, and the cooling air outlet is located at the inner end.

2. The assembly of claim 1, wherein a portion of the flow path has an annular cross-sectional geometry defined between the cooling tube and the stem.

3. The assembly of claim 1, wherein a portion of the flow path has a parti-annular cross-sectional geometry defined between the cooling tube and the fuel injector.

4. The assembly of claim 1, wherein
the cooling tube includes an outlet; and
a portion of the flow path extends from the fuel injector to the outlet.

5. The assembly of claim 1, wherein
the stem extends along an axis; and
the tip extends radially out from the stem relative to the axis.

6. The assembly of claim 1, wherein the fuel injector further includes a fuel conduit that extends through the stem and is fluidly coupled with the nozzle.

7. The assembly of claim 6, wherein the fuel conduit is one of a plurality of fuel conduits that extend through the stem and are fluidly coupled with the nozzle.

8. The assembly of claim 6, wherein an air gap extends around the fuel conduit and between the fuel conduit and the stem.

9. The assembly of claim 1, further comprising:
a base connected to the cooling tube and the stem;
wherein the base is adapted to mount the cooling tube and the fuel injector to a case of the turbine engine.

10. The assembly of claim 9, wherein a portion of the flow path extends through the base.

11. The assembly of claim 1, further comprising a heat exchanger adapted to provide the cooling air to the cooling tube.

12. The assembly of claim 1, further comprising a swirler mated with the tip.

13. An assembly for a turbine engine, the assembly comprising:
a combustor comprising a combustion chamber;
a cooling tithe through which a flow path extends;
a fuel injector including a stern connected to a tip, the stem arranged within the cooling tube, and the tip extending from the cooling tube to a nozzle, wherein the nozzle is configured to direct fuel into the combustion chamber; and
a duct located outside of the combustor and adapted to receive the cooling air from the cooling tube;
wherein the cooling tube is adapted to direct cooling air through the flow path;
wherein the cooling tube extends radially relative to a centerline of the turbine engine between an inner end and an outer end; and
wherein the cooling tube includes a cooling air inlet and a cooling air outlet, the cooling air inlet is located at the outer end, and the cooling air outlet is located at the inner end.

14. The assembly of claim 13, wherein the cooling tube is connected to the duct by a movable joint.

15. The assembly of claim 13, further comprising:
a turbine component;
wherein the duct is adapted to provide the cooling air to the turbine component.

16. An assembly for a turbine engine, the assembly comprising:
a combustor including a combustion chamber;
a structure forming a plenum outside of the combustor;
a cooling tube adjacent the combustor, the cooling tube configured with a radial outer cooling air inlet and a radial inner cooling air outlet, and the cooling tube extending radially across the plenum and between the radial outer cooling air inlet and the radial inner cooling air outlet; and
a fuel injector including a nozzle adapted to inject fuel into the combustion chamber;
wherein at least a portion of the fuel injector is arranged within a flow path that extends through the cooling tube; and
wherein the cooling tube is adapted to direct cooling air through the flow path.

17. The assembly of claim 16, wherein
the fuel injector further includes a stem connected to a tip;
the stem is arranged within the cooling tube; and
the tip interfaces with the combustor.

18. The assembly of claim 17, wherein the fuel injector further includes a fuel conduit that extends through the stem and is fluidly coupled with the nozzle.

19. The assembly of claim 16, further comprising a heat exchanger adapted to provide the cooling air to the cooling tube.

20. The assembly of claim 16, further comprising a turbine component adapted to receive the cooling air from the radial inner cooling air outlet.

* * * * *

UNITED STATES PATENT AND TRADEMARK OFFICE
CERTIFICATE OF CORRECTION

PATENT NO. : 10,184,663 B2  
APPLICATION NO. : 15/023606  
DATED : January 22, 2019  
INVENTOR(S) : John D. Frish Page 1 of 1

It is certified that error appears in the above-identified patent and that said Letters Patent is hereby corrected as shown below:

In the Claims

Column 7, Line 45, Claim 13 delete "tithe" and insert --tube--.

Column 7, Line 46, Claim 13 delete "stern" and insert --stem--.

Signed and Sealed this  
Fifth Day of March, 2019

Andrei Iancu  
*Director of the United States Patent and Trademark Office*